United States Patent
Defrank et al.

(10) Patent No.: US 10,753,337 B2
(45) Date of Patent: Aug. 25, 2020

(54) MOTION CONTROL SYSTEM AND METHOD WITH ENERGY HARVESTING

(71) Applicant: Jain Irrigation Systems Limited, Bambhori, Jalgaon (IN)

(72) Inventors: Michael Patrick Defrank, Madera, CA (US); Jack Goldberg, San Diego, CA (US); Randy L. Houk, San Diego, CA (US); Jonathan R. Hall, San Diego, CA (US)

(73) Assignee: Jain Irrigation Systems Limited, Bambhori (IN)

( * ) Notice: Subject to any disclaimer, the term of this patent is extended or adjusted under 35 U.S.C. 154(b) by 0 days.

(21) Appl. No.: 14/124,032

(22) PCT Filed: Oct. 30, 2013

(86) PCT No.: PCT/IN2013/000666
§ 371 (c)(1),
(2) Date: Dec. 5, 2013

(87) PCT Pub. No.: WO2014/068594
PCT Pub. Date: May 8, 2014

(65) Prior Publication Data
US 2015/0226177 A1    Aug. 13, 2015

(30) Foreign Application Priority Data
Oct. 30, 2012    (IN) .......................... 3142/MUM/2012

(51) Int. Cl.
*F03B 17/06*    (2006.01)
*F03G 5/06*    (2006.01)
(Continued)

(52) U.S. Cl.
CPC .............. *F03B 17/06* (2013.01); *A01G 25/16* (2013.01); *B05B 3/0486* (2013.01); *F03G 3/04* (2013.01);
(Continued)

(58) Field of Classification Search
CPC .. A01G 25/16; F03G 3/04; F03G 5/06; F03G 7/08; G05B 15/02; Y02E 10/28; F03B 17/06
See application file for complete search history.

(56) References Cited

U.S. PATENT DOCUMENTS 3,353,089 A  *  11/1967  Garrett ...................... H02P 9/38
                                                       322/27
6,568,416 B2 *   5/2003  Tucker ............... G05D 16/2053
                                                       137/14
(Continued)

OTHER PUBLICATIONS

International Search Report for International Application No. PCT/IN2013/000666 dated Jan. 21, 2015.
Written Opinion issued in International Application No. PCT/IN2013/000666 dated Jan. 21, 2015.

*Primary Examiner* — Chun Cao
(74) *Attorney, Agent, or Firm* — McCarter & English, LLP; David R. Burns; Coalton Bennett

(57) ABSTRACT

A motion control apparatus and method are disclosed. The motion control apparatus comprises a movable mechanism coupled to an external energy source, the energy source providing kinetic energy to the mechanism. An energy conversion module is mechanically coupled to the mechanism for converting kinetic into electrical energy. An electronic circuit is coupled to the energy conversion module and a storage module and a mechanism controller is coupled to the electronic circuit. A sensor module is coupled to both the electronic circuit and the movable mechanism to sense the movement of the movable mechanism to determine speed of the movable mechanism and transmit speed infor- (Continued)

mation to the electronic circuit. The method comprises applying energy to a movable mechanism, converting kinetic to electrical energy, storing the electrical energy converted, controlling the motion of the mechanism and sensing the movement of the mechanism.

21 Claims, 9 Drawing Sheets

(51) Int. Cl.
*F03G 7/08* (2006.01)
*B05B 3/04* (2006.01)
*F03G 3/04* (2006.01)
*A01G 25/16* (2006.01)
*G05B 15/02* (2006.01)

(52) U.S. Cl.
CPC ............... *F03G 5/06* (2013.01); *F03G 7/08* (2013.01); *G05B 15/02* (2013.01); *Y02E 10/28* (2013.01)

(56) References Cited

U.S. PATENT DOCUMENTS

| | | | |
|---|---|---|---|
| 7,175,113 B2 | 2/2007 | Cohen | |
| 2004/0195358 A1* | 10/2004 | Santiago | B05B 3/0431 239/200 |
| 2004/0232701 A1 | 11/2004 | DeFrank | |
| 2010/0007145 A1* | 1/2010 | Calley | F03D 7/0256 290/44 |
| 2010/0123313 A1* | 5/2010 | Hobdy | F03B 13/20 290/42 |
| 2010/0263479 A1* | 10/2010 | Thompson | H02K 7/025 74/572.1 |
| 2011/0049260 A1* | 3/2011 | Palmer | A01G 25/16 239/63 |
| 2011/0316276 A1* | 12/2011 | Crowley | F03B 1/02 290/42 |
| 2012/0029892 A1 | 2/2012 | Thulke | |
| 2012/0037725 A1* | 2/2012 | Verfuerth | A01G 25/16 239/289 |
| 2012/0193914 A9 | 8/2012 | Crowley | |

* cited by examiner

MOTION CONTROL SYSTEM AND METHOD WITH ENERGY HARVESTING

CROSS-REFERENCE TO RELATED PATENT APPLICATIONS

This application is a 35 U.S.C. § 371 national stage filing of International Application No. PCT/IN2013/000666, filed Oct. 30, 2013, which claims the benefit of Indian Patent Application No. 3142/MUM/2012, filed on Oct. 30, 2012. The contents of each of the foregoing applications are incorporated herein by reference in their entireties.

FIELD OF THE INVENTION

The present invention relates to a system and method for controlling the motion of a mechanism while harvesting electrical energy from kinetic energy of the mechanism's motion. An external energy source, such as the pressurized flowing water, is coupled to the mechanism and provides the kinetic energy from which the electrical energy is harvested. The motion control system comprises, for example, a rotating mechanism, and a means to control an aspect of the mechanism's motion, for example its rotational speed. As energy is harvested from the kinetic energy of the mechanism's motion, the energy source which powers the motion control features of the apparatus is the same energy source which powers the movement of the mechanism. In a preferred embodiment, there is no need to run wires from a remotely-located power source to bring electrical energy to the motion control system. The system may contain a rechargeable battery or some other form of electrical energy storage. In addition to using energy from the same energy source which powers the motion of the mechanism, the motion control system may also harvest energy from another source, such as from a solar panel. Harvested energy may also optionally be used to power an information display and/or a valve and/or some other type of electrically-powered auxiliary device in addition to the circuitry used for motion control. The motion control method incorporates one or more sensors coupled to the movable mechanism and the sensors provide information to aid and/or allow motion control. The sensors are also termed herein as the sensor module.

BACKGROUND OF THE INVENTION

Many commercial and industrial applications require motion control. Examples include 1) a valve or gate may need to be opened or closed at specific times and/or at specific rates; 2) a rotating mechanism, such as a sprinkler for irrigation purposes, may need to turn at a controlled rate or distribute water in a particular manner; or, 3) a turnstile which is pushed by a person may need to have its motion controlled in some fashion to, for example, ensure safety. Controlling the motion of any mechanism, such as a sprinkler or a turnstile, generally requires a source of energy. Often, a source of electrical energy is located in proximity to the movable mechanism. However, it is not always practical to provide electrical power from an external source to a motion control system. This may be because the movable mechanism is portable and wiring is cumbersome or because no electrical energy is available at the site of the movable mechanism. Additionally, there are costs associated with wiring electrical power to the site of a movable mechanism.

The present invention is directed toward a motion control apparatus employed in situations where there is no convenient nearby source of electrical energy. In the case of a rotating sprinkler, for example, the energy source which actually moves the rotating sprinkler mechanism is generally in the form of pressurized flowing water and electrical power may not be convenient or easy to obtain at the site of a sprinkler. Another movable mechanism at which electrical energy may not be convenient or easy to obtain is a human-powered turnstile, which is pushed by a person in order to gain access. In both these examples, it is possible to harvest energy from the source of energy which actually moves the mechanism, and this harvested energy can thus be used to power the electronic circuitry used for motion control. A sprinkler's rate of rotation may be controlled by electronic circuitry and the speed at which a turnstile turns to allow a person to safely pass through it may be controlled by electronic circuitry. The present invention utilizes the same energy source which provides power to move a mechanism to also provide power to electronic circuitry which accomplishes motion control.

U.S. Pat. No. 6,864,591 is entitled "Sprinkler Activated Generator," discloses an apparatus for irrigation, such as a sprinkler, which includes an electric generator for generating electricity. Current sprinkler system designs use some method of dissipating energy to slow the rotation of the sprinkler in order to reduce or eliminate the so-called rooster tail effect of high rotation speeds. This rooster tail effect causes small and uneven distribution patterns. The '591 patent, amongst other things, discusses how the inclusion of an electric generator in a sprinkler may reduce this rooster tail effect. The present invention improves upon the '591 patent by using the electricity which is generated by the electrical generator to power electronic circuitry used to control the motion of the sprinkler.

It is, therefore, advantageous to harvest electrical energy from the kinetic energy of a moving mechanism, and to use that harvested energy to power electronic circuitry which provides motion control.

OBJECTS OF THE INVENTION

1. It is primary object of the present invention to provide a motion control apparatus and method with energy harvesting;
2. It is another object of the present invention to provide an apparatus which harvests and stores energy;
3. It is another object of the present invention to provide an apparatus which provides flexible and repeatable motion control.
4. It is another object of the present invention to provide a motion control apparatus which does not require any additional source of power;
5. It is another object of the present invention to provide a motion control apparatus which eliminates the expenses of running wires and thereby reduce costs in production;
6. It is another object of the present invention to provide a motion control apparatus which has low maintenance cost;
7. It is another object of the present invention to provide a motion control apparatus which is robust.
8. It is yet another object of the present invention to provide a sprinkler system which harvests energy and utilizes that harvested energy for flexible and repeatable control of water distribution.

SUMMARY OF THE INVENTION

The above-mentioned drawbacks associated with existing systems are addressed by embodiments of the present application and explained in detail below;

The present application describes a motion control system and method with energy harvesting. Various embodiments of the motion control system are described along with methods for their use. The term 'system' and 'apparatus' are used interchangeably in the current specification and they refer to the same structure.

As an example, a sprinkler system which embodies various features of the present invention is an intelligent sprinkler system which harvests energy from the hydraulic source which powers the sprinklers. Each sprinkler in the system, by means of an energy transducer, generates electricity which is used to power electronic circuitry which in turn controls the water distribution pattern. The energy transducer can be termed as an energy conversion module. The generated electricity is also harvested and stored in an electrical storage device such as a rechargeable battery. The generated electricity also can be used by the sprinkler to power electronic circuitry which allows it to communicate with a remotely located computer system which collects sprinkler data, alerts the user of any malfunction, and allows the user to control and/or alter the water distribution pattern. Communication with a remotely located computer system is, in a preferred embodiment, wireless.

Each sprinkler in such a system contains its own electronic circuitry connected to its own energy transducer. This electronic circuitry comprises both energy-harvesting components and computational components that control the behaviour of the sprinkler, such as the rate and duration of the sprinkler's operation. In such a sprinkler system, hydraulic energy which would otherwise be wasted is harvested.

In this embodiment, a unique control system associated with an electric generator allows the electronic circuitry to both monitor and adjust the speed of rotation. Further, the energy harvested from the rotating sprinkler mechanism can be used to control a valve which periodically opens and closes, thus modulating the amount of water distributed by the sprinkler. A sprinkler without such a valve delivers water 100% of the time during which it receives pressurized flowing water. With a controlled valve as part of the sprinkler apparatus, the sprinkler can be configured to deliver water at a variety of different duty cycles, such as, for example 50% in which the valve is repeatedly turned on for 20 seconds and off for 20 seconds or 10% in which the valve is repeatedly turned on for 4 seconds and off for 36 seconds. Thus in of the present invention, the sprinkler can be controlled by a closed loop algorithm to provide a wide variety of desired water distribution patterns. For example, the sprinkler can be configured to spin at 20 RPM with a 50% duty cycle for 10 minutes followed by 50 RPM with a 75% duty cycle for 30 minutes.

In some situations, such as when a mechanized irrigation system such as a center pivot travels across a portion of land which requires no irrigation (such as a pond) the most suitable water distribution pattern may be no water at all or 0% duty cycle.

These "water distribution instructions" of rate and duty cycle and duration can be easily repeated or altered, thus allowing precise control of the water distribution pattern. Further, a group of sprinklers, such as the sprinklers mounted on a center pivot machine, may all be of the type described herein and such an arrangement can provide advantages of more precise water distribution over large areas, thus improving crop yields and conserving water.

In an embodiment of the invention, up to 500 sprinklers can be independently controlled so that different requirements for different portions of a field can be accommodated.

Another advantage of the present invention is that it harvests and stores energy that may be otherwise wasted in current systems. Another advantage of the invention, as applied to irrigation, is that it also provides for a more controlled distribution pattern that can be tailored for specific conditions. Agricultural fields are not uniform in either their water or nutrient requirements. Sprinklers designed in accordance with an embodiment of the present invention can be configured and instructed to optimize water distribution patterns to accommodate particular sets of conditions, such as soil moisture content, soil type, crop variety, weather conditions, etc., any number of times by wirelessly changing parameters stored in the sprinkler's memory. This allows for precision irrigation of the crop and increased yields.

Another advantage of the invention is that it can control the motion of mechanical assemblies such as turnstiles to enhance safety or to better control the flow of people or materials. Further, when applied to the dispensing of a quantity of fluid or powder or granulated substance in a controlled fashion in which the flow is powered by the force of gravity, the present invention can not only control the flow of material but can also measure the amount of material dispensed and wirelessly report any problems or error conditions, without requiring any power source other than the power in the gravity flow itself.

An apparatus designed in accordance with the present invention harvests energy, for example the energy of flowing water (hydraulic), or the energy caused by people or objects pushing against a turnstile or gate, or the energy of a flowing fluid or granular substance which is moving due to gravity. Thus it is an advantage that the control and communication functions which are desired in an apparatus do not require any additional source of power, eliminating the expense of running wires or providing some other source of energy. Also, because power is now resident in the apparatus itself, for example a sprinkler, the apparatus can include, for example, sensors which require power and/or a wireless communication device and/or other auxiliary devices such as an information display or a valve. The wireless communication device is referred to as a 'wireless communication module'.

An apparatus designed in accordance with the invention can either be programmed ahead of time or programmed in the field by a portable computer with the appropriate wireless network hardware and software. Each individual apparatus (e.g. sprinkler) has its own antenna that communicates to a remote unit which
  1) reports information to a system manager;
  2) allows the system manager to control the operation of each individual apparatus; and
  3) immediately informs the system manager of any problems or errors.

In an embodiment of the invention, wireless reporting of apparatus status frees the system manager from having to place personnel in the field to know how each apparatus is performing. Maintenance costs are reduced and assurance that every apparatus is operating properly is greatly enhanced.

Further a highly reliable and robust rechargeable battery technology may be utilized in an apparatus designed in accordance with embodiments of this invention, such as Lithium Iron Phosphate battery technology.

Embodied in an irrigation system, this invention is suitable for use in agricultural installations, such as crop fields, or for irrigation of golf courses, both situations in which water conservation is advantageous. Whereas, embodied in an apparatus or system which controls the flow of grain or some other granular substance, this invention is suitable for use in silos or chemical or food distribution installations where an electrical energy source may not be readily accessible.

In a preferred embodiment of the apparatus, an irrigation system comprised of sprinklers is powered hydraulically by pressurized water flow in the usual and well-understood manner. The sprinklers are rotational in nature and the pressurized water spins the sprinkler when all valves which may control the water flow to the sprinkler are opened. When a sprinkler spins, the spinning shaft (powered by the flowing pressurized water) is coupled to an electrical generator. This generator provides power to electronic circuitry which:

1) measures the rate of rotation (RPM) of the sprinkler;
2) controls the rate of rotation of the sprinkler by providing braking force by means of the electric generator; and
3) optionally provides the sprinkler with the capability to communicate wirelessly with a remote device which can collect data, modify the behaviour of the sprinkler and alert the system manager if the sprinkler reports any error or warning conditions.

The electric generator may be a DC type generator or an AC type generator. By varying the electrical load on the generator, the generator produces a braking force which can slow down the rotational speed of the sprinkler. A brushed DC motor, for example, when its terminals are connected to a relatively large electrical load, say a resistor of low value (e.g. <50 ohms), will be more difficult to spin than the same motor connected to a resistor of high value (a small electrical load). A brushed DC motor acts as an electrical generator when it spins. The electrical load on the generator (motor) will produce torque due to current flowing through its windings, thereby tending to slow the speed of rotation. An AC generator (for example a wind turbine) also exhibits the characteristic that an electrical load connected to its terminals (thus causing current to flow through its windings) while it is spinning will tend to cause its speed to decrease. Electrical braking has been used to prevent excessive rotational speed in wind turbines and is also used in vehicle applications (electric locomotives and automobiles).

In another embodiment of the invention, a rotating mechanism is powered by gravity-fed grain. As in the above-described embodiment, a mechanically coupled generator is used to: a) measure the speed of the rotating mechanism, thus monitoring the amount of grain flowing over time; b) control the flow rate of the grain as it passes through the rotating mechanism by using electrical braking (also described above); and c) generate electricity to provide power to the electronics which measures the speed, controls the flow rate of the grain and performs other functions.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense. The term 'system' and 'apparatus' are used interchangeably in the current specification and they refer to the same structure.

Figure 1:
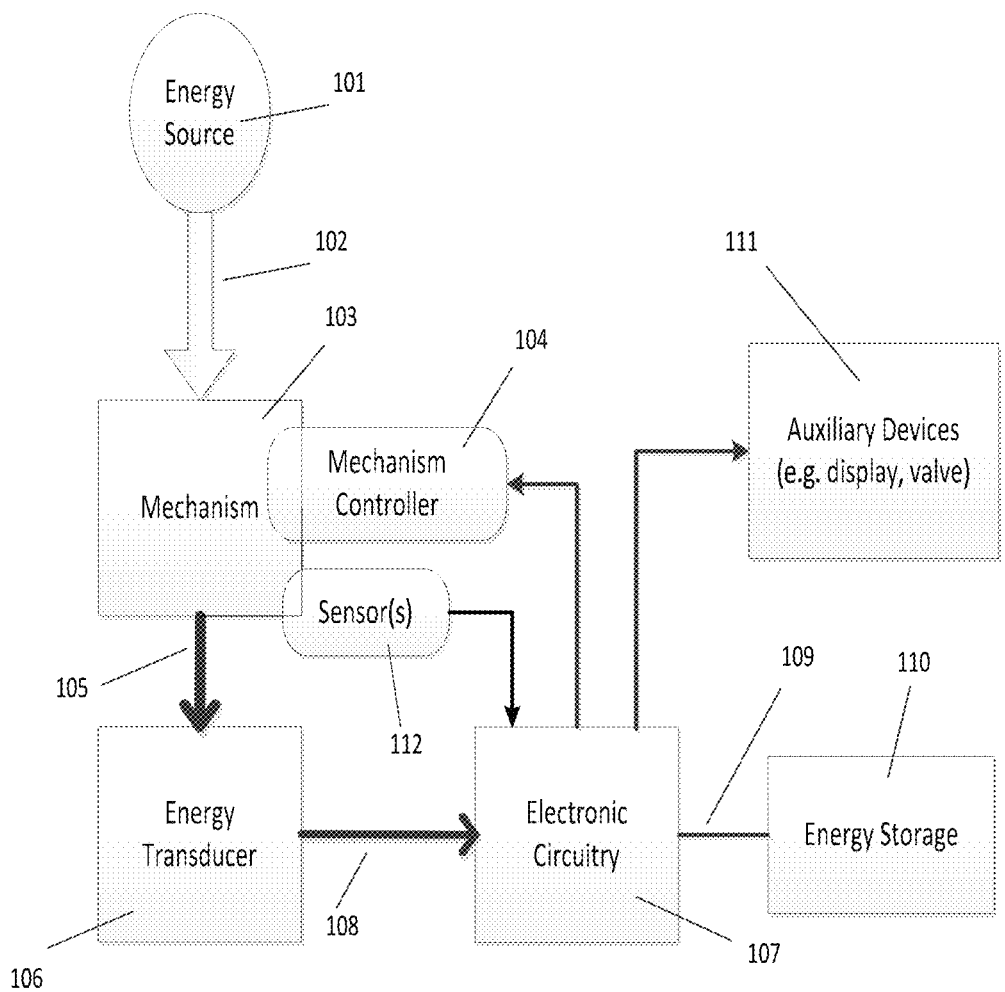
FIG. 1 is a block diagram of a motion control apparatus with energy harvesting in accordance with an aspect of the present invention.

FIG. 1 is a motion control apparatus with energy harvesting. An energy source 101 provides kinetic energy 102 to move a movable mechanism 103. The energy source is external to the movable mechanism and thereby referred to as an external energy source. The energy source may be hydraulic, as in the case of an irrigation system, or the energy source may be human, as in the case of a human-powered turnstile, or the energy source may be kinetic energy which results from a falling gravity-fed substance such as grain in a silo. An energy transducer 106 i.e. an energy conversion module 106 is mechanically coupled 105 to the moving mechanism 103 and this transducer converts some of the kinetic energy of the moving mechanism into electrical energy 108 which powers electronic circuitry 107. The electronic circuitry 107 may perform many different functions when it is so powered by the transduced energy 108 from transducer 106.

A primary function of the electronic circuitry is to control the motion of mechanism 103 through the use of a mechanism controller 104. Mechanism controller 104 may be an electromagnetic machine such as a motor or a generator. In a preferred embodiment, mechanism controller 104 is an electric generator configured to provide braking force to a rotating mechanism and, in fact, mechanism controller 104 may be the same as energy transducer 106. An electric generator can be used as an energy transducer while at the same time it may be used as a mechanism controller 104. As described above, in the case where mechanism controller 104 is an electric generator, it may be provided with an electrical load in which case it will produce torque or braking force which will tend to slow the motion of mechanism 103. The electrical generator can be a center-tapped alternating current generator or a direct current generator.

In a preferred embodiment, an energy storage device 110 is provided such that electronic circuitry 107 will be able to function even when mechanism 103 is still and no energy is flowing from energy transducer 106 to electronic circuitry 107. The energy storage device can be also termed as an energy storage module 110 or an electrical energy storage device.

Electronic circuitry 107 also has the capability of sensing things, for example sensing the motion of the mechanism 103, by means of sensors 112. The sensors can be collectively called a sensor module. There can be a plurality of sensor modules as well. A particular sensor may be provided to sense the motion of the mechanism and/or some other parameter of interest which would be used to determine how to control the mechanism. Thus a closed loop system is provided which senses via 112 and controls via 104. The electronic circuitry 107 preferably operates with very little power, on the order of 100 microwatts. As will be described in further detail with respect to FIGS. 4, 5, and 6, electrical braking of the mechanism 103 can be accomplished with very little power having to be supplied to the circuitry 107.

Further, electronic circuitry 107 may operate an auxiliary device 111 such as an information display and indicators and/or a valve and/or some other type of electrically-powered device.

Figure 2:
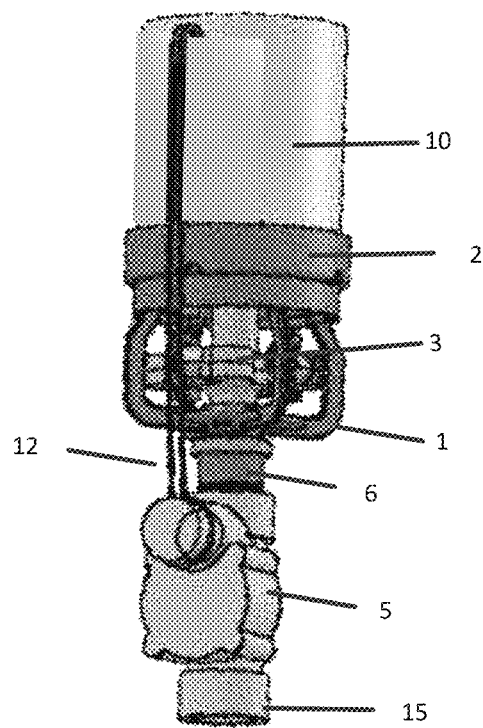
FIG. 2 is a view of an embodiment of a motion control apparatus (sprinkler) in accordance with an aspect of the present invention.
Figure 3:
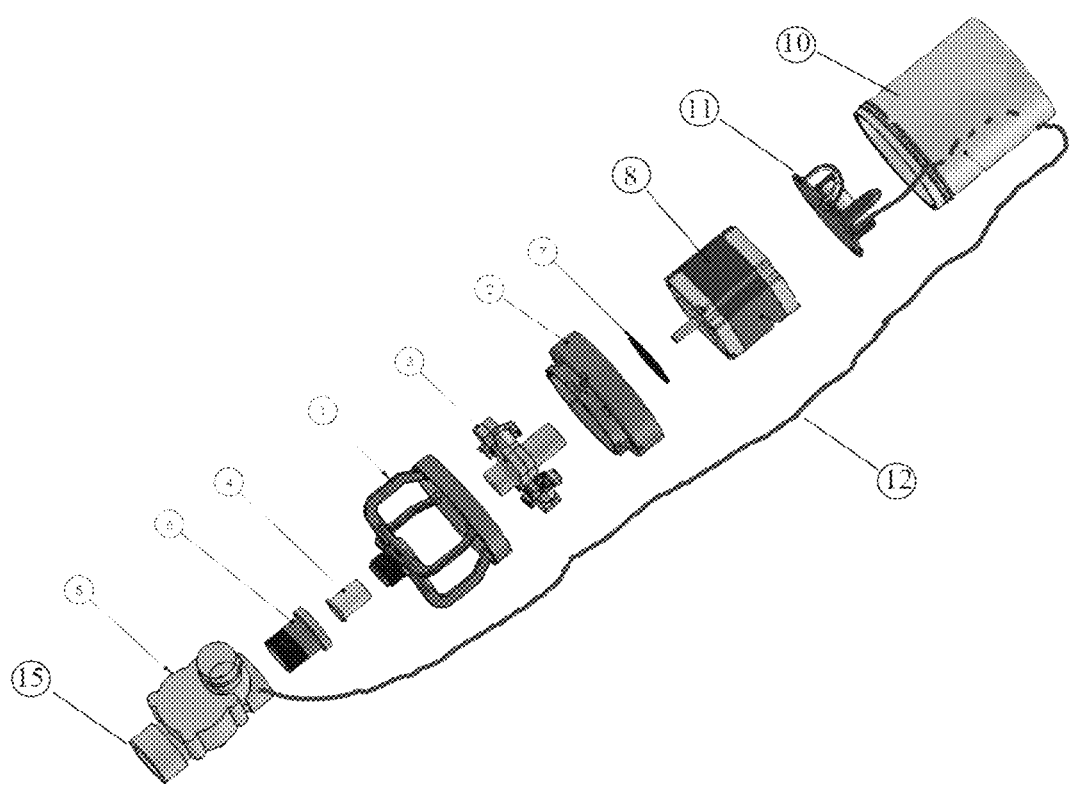
FIG. 3 is an exploded view of an embodiment of a motion control apparatus (sprinkler) in accordance with an aspect of the present invention.

FIG. 2 is a view of an embodiment of the invention, a sprinkler. Water under pressure is coupled to the sprinkler at connector 15 and when valve 5 is open, this water flows through adapter 6 into rotor 3 which comprises at least one nozzle. Water flowing through the nozzles of rotor 3 causes the rotor to rotate and thus the water is distributed for crop irrigation. A frame 1 surrounds the rotor 3. The rotor is coupled to the motion control apparatus through sprinkler housing cap 2. Housing 10 is attached to sprinkler housing cap 2 and within housing 10 is circuit board assembly 11, and the generator 8 used to both harvest energy and provide braking force for motion control. The circuit board assembly 11 and generator 8 are shown in FIG. 3, described below. Control wires 12 are shown connected to valve 5 and traversing through housing 10. These control wires can open or close valve 5, which is preferable a low power electrically actuated valve which can interrupt or allow the flow of water to rotor 3. Electronic circuitry on circuit board assembly 11 controls valve 5.

An exploded view of the embodiment of FIG. 2 is shown in FIG. 3. In addition to the items illustrated in FIG. 2, FIG. 3 also shows generator 8 and circuit board assembly 11. Circuit board assembly 11 comprises electronic circuitry for harvesting energy and is electrically connected to generator 8 with wires (not shown) and also comprises a rechargeable battery, for example a lithium iron phosphate type battery (e.g. K2 Energy's model LFP123). In a preferred embodiment, circuit board assembly 11 also comprises a wireless transceiver. Control wires 12 are shown connected to circuit board assembly 11, traversing through housing 10 and connected to low power electrically actuated valve 15. The generator and electronics are housed in a water-tight environment enclosed by housing 10 and sprinkler housing cap 2.

Figure 4:
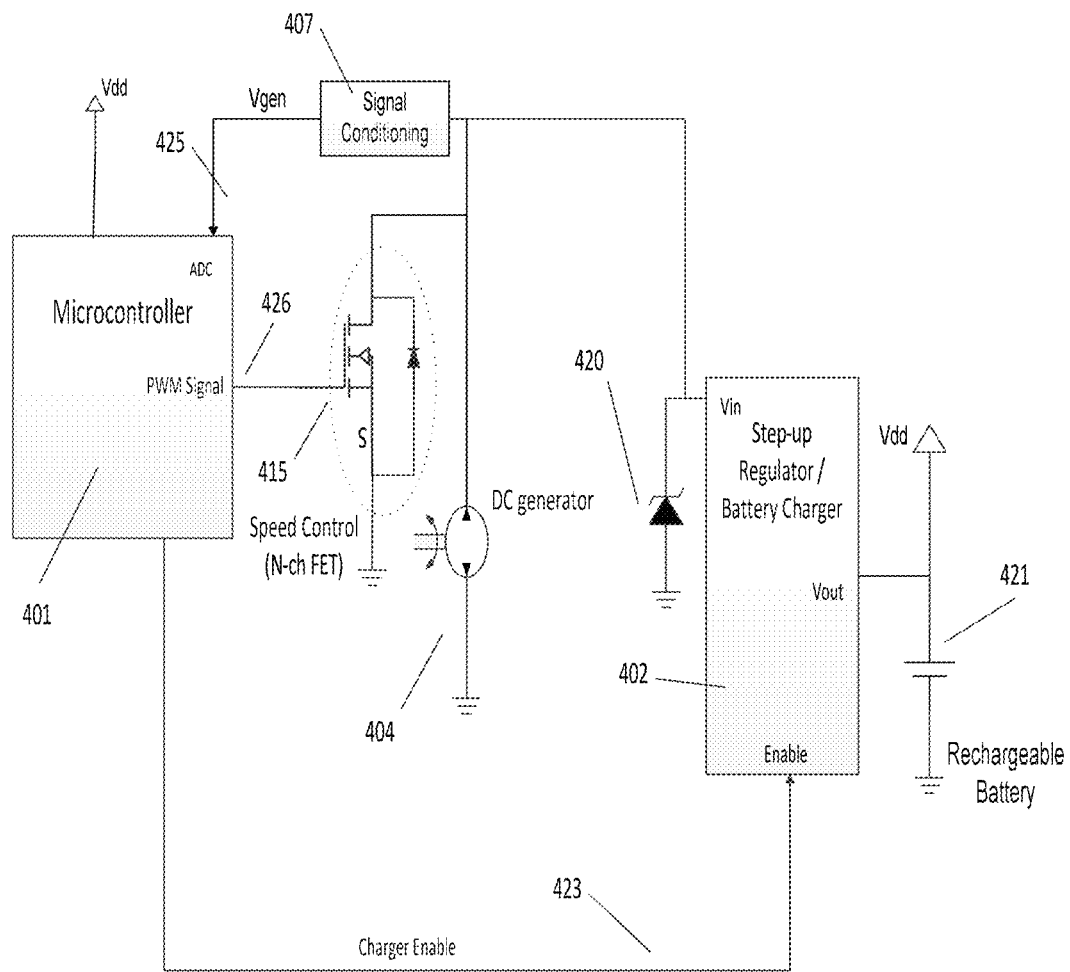
FIG. 4 is a schematic block diagram of an embodiment employing a DC electric generator in accordance with an aspect of the present invention.

In an embodiment of the invention shown in FIG. 4, a DC generator 404 is used as both the energy transducer (ref 106, FIG. 1) and the mechanism controller (ref 104, FIG. 1). A rechargeable battery 421 is employed to store harvested energy and to provide power to microcontroller 401. Microcontroller 401 (e.g. Microchip Technology model PIC18F26K20) comprises, amongst other things, an analog to digital converter and has the capability to provide a pulse-width-modulated (PWM) digital signal 426. In a preferred embodiment microcontroller 401 is connected to a 76.8 KHz crystal which supplies the microcontroller clock.

The DC generator may be a brushed DC-motor and in an embodiment of the invention a DC gear motor, e.g. Pittman model 8712-21 is employed. The Pittman 8712 21 has internal gearing of 19.5 to 1. The DC output of the DC generator increases with increasing rotational speed and, if the DC generator is not electrically loaded, the voltage across the two terminals of DC generator 404 is proportional to its rotational speed. Increased gear ratio will cause greater voltage output for a given rotational speed and will also increase the amount of torque (braking force) produced for a given electrical load on the generator.

Referring again to FIG. 4, the output of DC generator 404 can be fed directly into battery charging circuitry 402. A zener diode 420, for example a 5.1V zener, is provided to prevent excessive voltage at the input of battery charging circuitry 402. Battery charging circuitry 402 is preferably a step-up type voltage regulator designed specifically for energy harvesting applications, such as the LTC3105 manufactured by Linear Technology. The output of battery charging circuitry 402 connects directly to the positive terminal of rechargeable battery 421 and this connection, labelled $V_{dd}$ in FIG. 4, powers the microcontroller 401 and other electronic components in the electronic circuitry.

N-channel field-effect transistor 415 provides an electrical load on DC generator 404 when it is turned on and conducting. Microcontroller 401 has the capability of outputting a pulse-width-modulated signal 426 which can be applied to the gate of transistor 415. The duty cycle of that PWM signal can be varied such that electrical load on DC generator 404 can be varied in a controlled and programmable fashion. Microcontroller 401 can be programmed to adjust the duty cycle of the PWM signal 426 in a manner which causes the rotational speed of the DC generator 404 to be adjusted and controlled.

The frequency of the PWM signal 426 applied to the gate of FET 415 must be such that the motion of the controlled mechanism is regulated smoothly. The inventors have found that in an embodiment, a PWM frequency of greater than 100 Hz is adequate to ensure smooth motion.

The measurement of the rotational speed of the DC generator is accomplished by supplying microcontroller 401 with a signal representative of the voltage output of the DC generator. As explained above, the voltage output of the DC generator when it is not loaded electrically is proportional to and thus representative of the rotational speed of the generator. Signal conditioning circuitry 407 ensures that the output voltage of the DC generator 404 is properly conditioned (filtered and/or scaled) to be measured by the integral analog-to-digital converter (ADC) which is contained in microcontroller 401.

With knowledge of the present rotational speed of the generator 404, an algorithm can be developed using well-understood principles that will adjust the PWM duty cycle of signal 426 in order to either increase or decrease the electrical load on the generator 404 and thus either decrease or increase the rotational speed of generator 404. This control loop can thus, with a degree of accuracy and with certain dynamic characteristics, control and stabilize the rotational speed of the generator. This control in turn can impact the motion of the mechanism to which the DC generator 404 is coupled in a desirable manner. For example, the rotational speed of a sprinkler can be controlled in this manner.

It is important to note that in order to ascertain the rotational speed of DC generator 404, there must be either no or a known electrical load on generator 404. During the time that microcontroller 401 is determining the rotational speed of generator 404, transistor 415 is preferably turned off and the battery charging circuitry 402 is preferably disabled. In that way there will be no current output from the DC generator and the voltage measured at its terminals will be adequately representative of its rotational speed. In a preferred embodiment, the battery charger 402 is disabled (via control line 423) and the speed regulating transistor 415 is off for a short period of time during which the ADC of microcontroller 401 measures the DC generator's output voltage. This measurement process can take place very quickly, on the order of milliseconds, and thus although the PWM signal will not be controlling the speed of the generator 404 for a short period of time, the rotating assembly, due to its inertia, will not substantially change speed. Therefore the motion control system can accurately sense the rotational speed of the generator and thereby have knowledge of the motion of the mechanism.

Less electronics is required to harvest the energy from a DC generator as opposed to an AC generator because an AC output would require rectification. Also, as discussed below, it is easier to vary the electrical load on a DC generator as opposed to an AC generator in order to provide braking force. These facts may lead one of skill in the art to choose to operate the motion control system with a DC generator rather than an AC generator. However, a brushed DC generator with gearing has the disadvantages of a) the brushes themselves (they wear); and b) the gears themselves (they wear, increase frictional loss and add cost).

Figure 5:
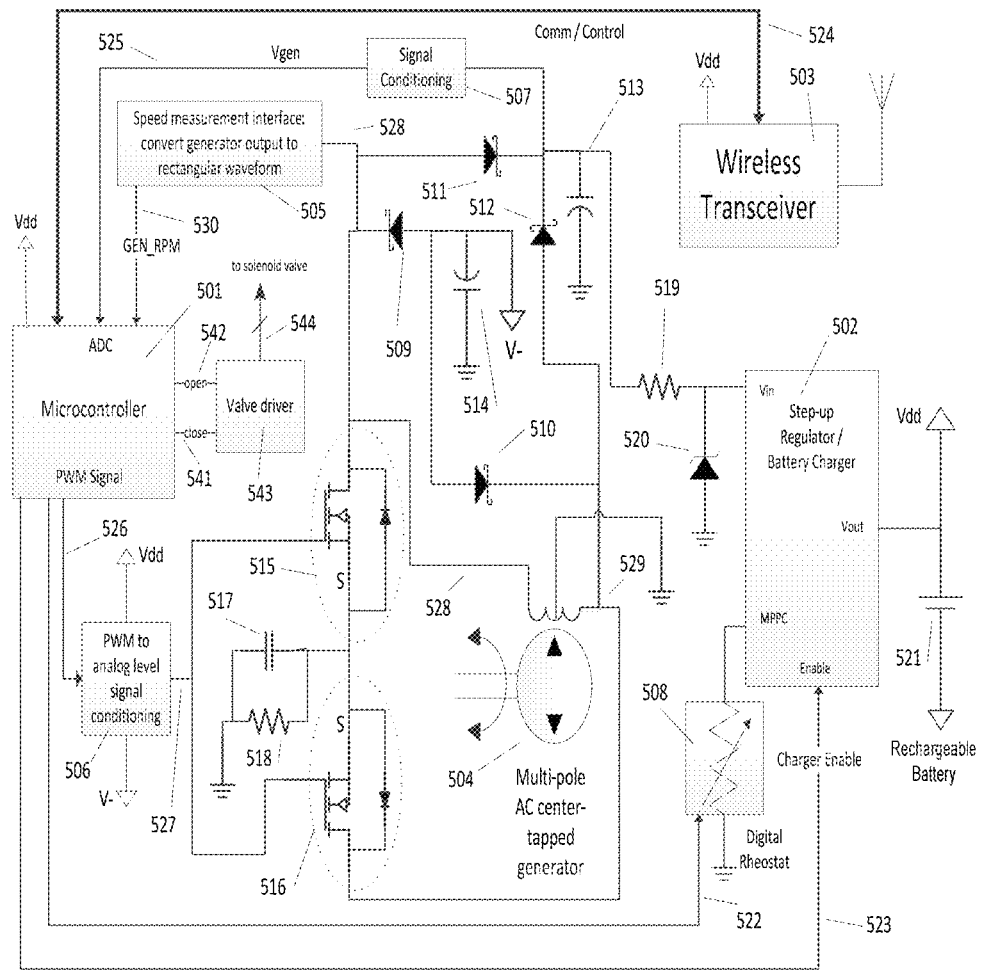
FIG. 5 is a schematic block diagram of an embodiment employing an AC electric generator and wireless messaging in accordance with an aspect of the present invention.

Because AC generation may be advantageous, FIG. 5 is presented as an alternative preferred embodiment. In FIG. 5, an AC generator 504 is used rather than the DC generator 404 of FIG. 3.

Now referring to FIG. 5, as in the DC generator-based design illustrated in FIG. 4, there is a microcontroller 501, battery charging circuitry 502, and a rechargeable battery 521. In a preferred embodiment microcontroller 501 is connected to a 76.8 KHz crystal which supplies the microcontroller clock. The generator 504 in FIG. 4 is an AC generator, and it is a centre-tapped design. The centre-tapped nature of AC generator 504 simplifies the simultaneous harvesting of energy (by means of full-wave rectification provided by rectifiers 511 and 512 and capacitor 513) and electrical braking of the AC generator 504 (by means of field-effect transistors 515 and 516 along with associated circuitry) to be described below. It is possible to utilize an AC generator 504 which has no gearing and achieve good results with the present invention. It may be desirable in some embodiments, however, to have a geared AC generator.

Shown in FIG. 5 is an AC centre-tapped generator 504. This is a three-terminal electromagnetic device and devices similar to this have been used in wind turbines. The centre tap of generator 504 is grounded. The inventors sought a three-terminal AC centre-tapped generator to use in the invention and, although such devices can surely be developed and have been developed for large power applications such as wind turbines, the inventors found six-terminal devices which worked very well, for example the model CPT21 hybrid stepper motor from Kollmorgen. Kollmorgen's model CPT21 is designed to be primarily used as a unipolar two-phase stepper motor and has six terminals: two centre-tapped windings. By inclusion of additional circuitry, identical to that formed by FETs 515 and 516 and capacitor 517 and resistor 518, connected to the second centre-tapped winding, the system illustrated in FIG. 4 can be adapted to easily accommodate a commercially-available unipolar two-phase hybrid stepper motor such as Kollmorgen model CPT21.

The full-wave rectification shown in FIG. 5 comprises rectifiers 511 and 512 and capacitor 513 to supply a positive DC voltage derived from outputs 528 and 529 of AC generator 504. The full-wave rectification shown in FIG. 4 also comprises rectifiers 509 and 510 and capacitor 514 to supply a negative DC voltage derived from the outputs of AC generator 504. The positive voltage derived from the AC generator is supplied to the input of battery charging circuitry 502 through resistor 519. As in FIG. 4, FIG. 5 shows a zener diode 520 to protect the input of the battery charging circuitry from excessive voltage which might occur at high rotational speeds of the generator 504.

In a preferred embodiment and as shown in FIG. 5, battery charging circuit 502 comprises an input for "maximum power point control," labelled MPPC. Linear Technology's LTC3105 step up DC to DC converter comprises an MPPC control terminal. According to the LTC3105 datasheet, the user programmable MPPC set point maximizes the energy that can be extracted from any power source. The MPPC set point is determined by the value of a resistor placed between the MPPC terminal and ground. In a preferred embodiment, the LTC3105 is used as the battery charging circuitry 502 and microcontroller 501 adjusts the value of digital rheostat 508 thus maximizing the energy that can be extracted from the generator 504.

In some applications that is important because the generator rotational speed and thus its power output will vary, as will the state of charge of the rechargeable battery. Digital rheostat 508 may be, for example, the MCP4452-104E manufactured by Microchip Technology. Other digital rheostats or digital potentiometers are known to those of skill in the art and may be used to adjust the MPPC set point of the battery charging circuitry. Control lines 522 are connected between microcontroller 501 and digital rheostat 508, enabling programmable control of the MPPC set point of the battery charger.

One of the terminals of generator 504, labelled in FIG. 5 as 528, is the input to speed measurement circuitry 505. The output of speed measurement interface circuitry 505 is a signal 530 which can be evaluated by microcontroller 501 to determine the rotational speed of the AC generator 504. Speed measurement interface circuitry 505 is described in further detail below in the discussion regarding FIG. 7. Note that the electrical signal 528 is an AC analog signal. The amplitude of signal 528 is influenced by the electrical braking which is in effect, however it has a basic frequency which represents the speed of rotation of AC generator 504.

In an embodiment of the invention, the AC generator is a stepper motor (e.g. Kollmorgen model CPT21) and the signal 528 has a frequency related to the speed of rotation and the number of poles in the generator (stepper motor) design. Kollmorgen model CPT21 has 6 leads (as stated above it is a two-phase unipolar stepper motor) and 50 poles. Thus the primary frequency component (in Hz) of the signal 528 is 50 times the rotational speed in revolutions per second. For example, the frequency of the signal at 528 would be 50 Hz at 60 RPM (60 RPM is 1 revolution per second).

Speed measurement interface circuit 505 converts the AC analog generator signal, which at low speeds (such as 8 RPM) may be of a low amplitude such as 50 mV RMS and at high speeds (such as 160 RPM) may be of an amplitude as high as 10V RMS. to a rectangular digital waveform. The frequency of the output signal 530 of speed measurement interface circuit 505 is thus a rectangular digital waveform, the frequency of which can be sufficiently accurately measured by microcontroller 501 by methods well known to those of skill in the art. It should be noted that at low speeds not only is the amplitude low but also the frequency is of a low value. For example, at 8 RPM, the frequency output of a 50 pole AC generator is 8*50/60 or 6.67 Hz.

A preferred embodiment of the invention utilizes a speed determination algorithm which captures the time at which transitions occur on the rectangular waveform (signal 530). Signal 530 is the output of speed measurement interface circuit 505. By counting microcontroller clock transitions which occur between, for example, positive-going transition of the signal 530, the period of the AC signal at line 528 can be determined and thus the rate of rotation of the AC generator 504 can be determined.

The aforementioned PIC18F26K20 comprises what is called "capture" functionality. This means that the microcontroller 501 can measure the time between positive going transitions of signal 530 to a resolution of 4 times the period of the microcontroller clock. The details of the capture functionality are well documented and there are other techniques known to those of skill in the art which would allow microcontroller 501 to determine a value representative of the rate of rotation of the generator 504.

The portion of the electronic circuitry which enables the microcontroller to electrically brake the AC generator 504 comprises FETs 515, 516, capacitor 517, resistor 518 and PWM to analog level signal conditioning 506. The PWM to analog level signal conditioning is described further below in reference to FIG. 6. Following is an explanation of the operation of the electrical braking of the AC generator 504 in the embodiment shown in FIG. 5.

It is known to those with skill in the art that a field effect transistor, when biased to conduct, can pass current either from source to drain or from drain to source. By placing two N-channel FETs in series with their sources connected together and with their gates connected together and with each of their drains connected to one of the terminals of a centre-tapped generator coil, a variable electrical load which conducts AC can be provided to that generator winding. Resistor 518 and capacitor 517 ensure that the sources of the two FETs 515 and 516 remain at a voltage level within the operational range of the circuit for all rotational speeds of generator 504 which might be encountered and throughout the full range of gate voltages which might be applied. The sources of FETs 515 and 516 cannot be grounded because, if they were, the intrinsic diodes which are present within each of the FETs 515 and 516 would conduct to ground, and this would defeat the purpose of the circuit. The sources of the FETs 515 and 516 similarly cannot be left floating because in that case the voltage at the junction of the sources would not remain within a proper operating range for correct performance of the circuit. Resistor 518 must be of a high enough value such that any conducted currents flowing through either of the intrinsic diodes present within the FETs and thus flowing also through resistor 518 cause insignificant braking force. In one embodiment, the value of resistor 518 is 10K ohms and the value of capacitor 517 is 1 microfarad.

In a preferred embodiment, the voltage at the gates of FETs 515 and 516 (which are connected together and are driven by signal 527) is a voltage level ranging from V− to $V_{dd}$. Because of the manner in which the voltage at the sources of the FETs 515 and 516 is set, it is necessary to supply a negative voltage as low as V− to the gates in order to ensure that the FETs can be turned completely off. When FETs 515 and 516 are both turned completely off there is minimum braking force and maximum rotational speed. Similarly, in order to ensure that the FETs 515 and 516 can be completely turned on, as required for maximum braking force and minimum rotational speed, it is necessary to supply a positive voltage as high as $V_{dd}$ to the gates.

PWM to analog level signal conditioning 506 converts PWM signal 526 from microcontroller 501 to an analog signal ranging from V− to $V_{dd}$, dependent upon the duty cycle of the PWM signal 526. The requirement to supply a negative gate voltage to FETs 515 and 516 for minimum braking force led the inventors to create the V− supply in the circuit by means of full wave rectification of harvested AC energy from generator 504. As described above, the V− supply is provided by the action of diodes 509 and 510 and capacitor 514.

FIG. 5 also shows a connection from capacitor 513 through a signal conditioning block 507 to microcontroller analog to digital converter (ADC) input 525. This connection allows microcontroller 501 to monitor the input voltage to battery charging circuit 502. In an embodiment of the invention, microcontroller 501 monitors this voltage on line 525 along with the rate of rotation of generator 504 and uses this information to set rheostat 508 for efficient battery charging. The amount of charging current can roughly be determined by comparing the voltage at 525 with the battery charging circuit 502 enabled to the voltage at 525 with the battery charging disabled. If the difference is small, charging is either minimal or not taking place. (Such a technique can also be used in the system of FIG. 4 with a DC generator).

Further, FIG. 5 includes the wireless transceiver 503. This is a low power wireless transceiver such as the Dust Networks model M2510-1 or may be a Zigbee-based product (for example, Zigbee RF4CE products manufactured by Microchip Technology). The wireless transceiver, when connected into a network, can communicate with a "base station." Refer to the discussion of FIG. 9 below. In a preferred embodiment, communication between microcontroller 501 and wireless transceiver 503 is by means of a standard 9600 baud UART interface.

Finally, FIG. 5 includes valve driver electronics 543. The valve driver receives signals from microcontroller 501, for example, a valve close signal 541 and a valve open signal 542. Valve driver circuit 543 processes microcontroller signals 541 and 542 to properly control a low power solenoid valve via valve control lines 544. Although FIG. 4 does not includes circuitry for control of a local water flow on/off valve, circuitry similar to valve driver 543 can be included in an embodiment with a DC generator. This local on/off valve can be turned on and off to alter the amount of water distributed by the sprinkler.

Figure 6:
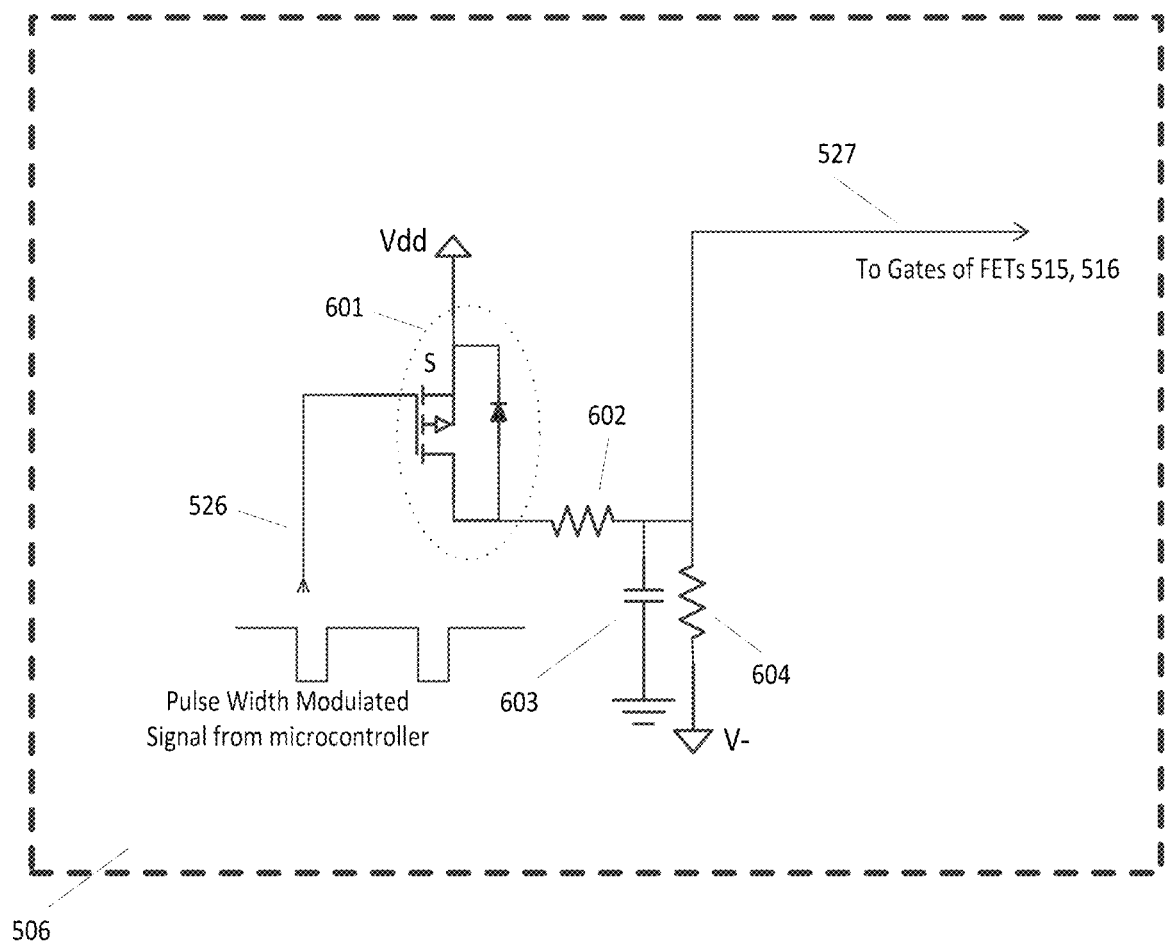
FIG. 6 is an exemplary circuit diagram according to one embodiment of the invention showing signal conditioning for speed control in a system employing an AC generator in accordance with an aspect of the present invention.

FIG. 6 shows the signal conditioning for AC generator speed control (block 506 of FIG. 5). The purpose of this circuitry is to convert the PWM signal outputted by microcontroller 501 (signal 526) to an appropriate analog gate voltage 527 to be applied to the gates of FETs 515 and 516. This signal conditioning circuitry comprises P-channel FET 601, resistor 602, capacitor 603 and resistor 604. PWM signal 526 turns on and off P-channel FET 601. When FET 601 is off (line 526 high) no current flows through resistor 602 and the gate signal 527 applied to FETs 515 and 516 will move toward V−. The rate of change of voltage 527 depends on the values of resistor 604 and capacitor 603. When PWM signal 526 is low (FET 601 on), current will flow through resistor 602 and the gate signal 527 will increase toward $V_{dd}$.

Thus, by varying the duty cycle of PWM signal 526, the gate bias can be controlled between V− and $V_{dd}$.

Note that in FIG. 4, a PWM signal is applied directly to the gate of N-channel FET 415. Although applying a PWM signal with a high level of $V_{dd}$ and a low level of V− to the gates of FETs 515 and 516 of FIG. 5 may control the electrical braking in an acceptable manner, the inventors found that using an analog signal at the gates of FETs 515 and 516 is advantageous in that it avoids any aliasing artifact which may be caused by the relationship and interaction of the PWM frequency with the AC generator's 504 output frequency.

Figure 7:
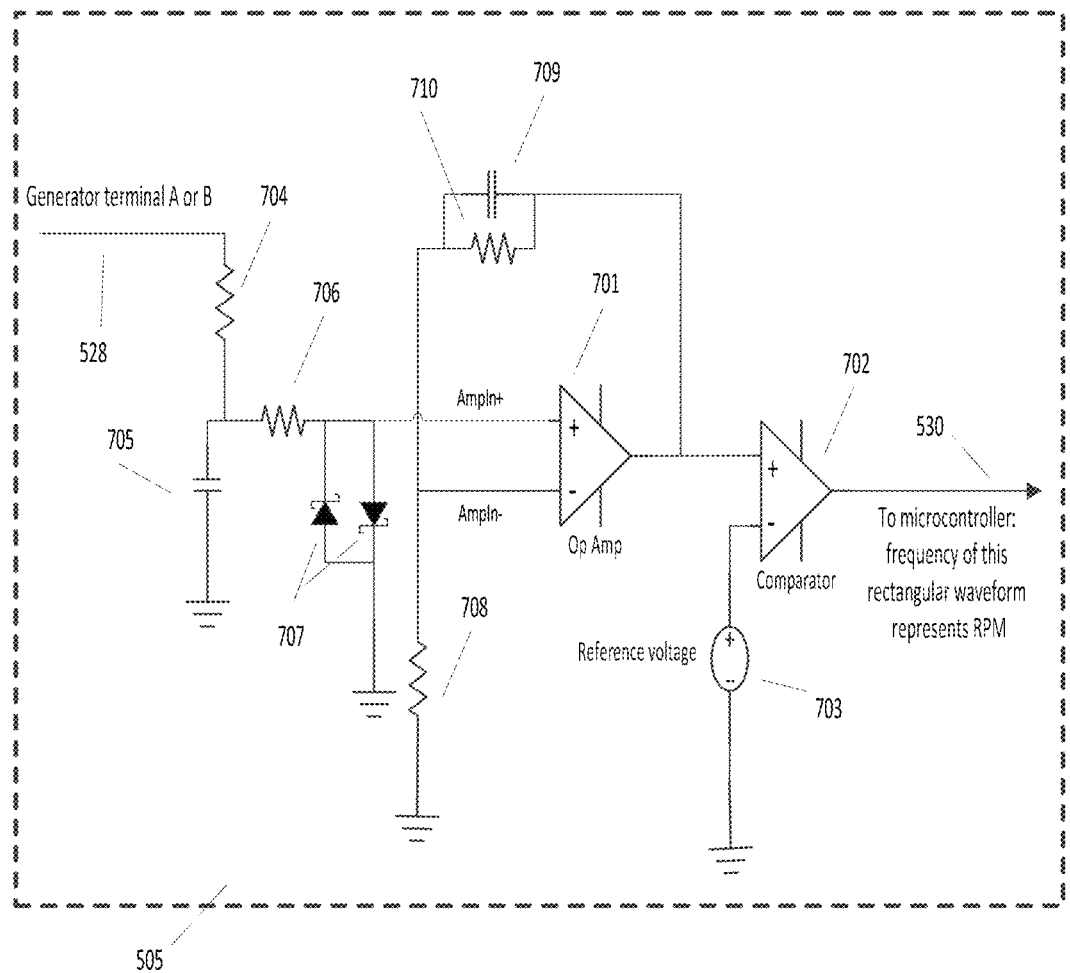
FIG. 7 is an exemplary circuit diagram according to one embodiment of the invention showing speed measurement circuitry in a system employing an AC generator in accordance with an aspect of the present invention.

FIG. 7 shows the detail of one embodiment of speed measurement interface circuitry 505. The circuitry of FIG. 7 converts the generator output AC signal 528 to a logic-level rectangular waveform 530 which is supplied to microcontroller 501. Microcontroller 501 uses that waveform at 530 to determine the rotational speed of generator 504. Generator signal 528 is filtered by resistor 704 and capacitor 705 and then supplied to operational amplifier 701 via resistor 706. Clamping diodes 707 prevent the voltage at the negative input of op amp 701 from exceeding the forward drop of diodes 707, thus preventing excessive voltage at the operational amplifier input. Op amp 701 then amplifies that filtered and clamped signal and further filters it. Resistors 710 and 708 and capacitor 709 perform that amplification and further filtering in a manner well-understood by those with skill in the art. The output of op amp 701 is provided to the positive input of comparator 702. Both the op amp 701 and comparator 702 in an embodiment of the invention are powered only by $V_{dd}$ and thus the signal at the positive input of comparator 702 is always a positive voltage. The comparator 702 has its negative input connected to a reference voltage and thus the output of comparator 702 (signal 530) is a rectangular waveform representative of the frequency of the signal 528 from generator 504.

In an embodiment of the invention op-amp 701, comparator 702 and reference voltage 703 are all components within a very low power package, Linear Tech's LTC1541. Exemplary values of components in the circuit of FIG. 7 are as follows: Resistor 704—22 kΩ Capacitor 705—0.033 µF, Resistor 706—10 kΩ, Capacitor 709—0.001 µF, Resistor 710—470 kΩ, Resistor 708—1 kΩ.

In the case of Linear Technology's model LTC1541 the voltage reference is 1.2 volts. This reference voltage is more accurate than the reference voltage that may be intrinsic to microcontroller 501, which in the case of Microchip's PIC18F26K20 is also 1.2 volts. In a preferred embodiment an external reference voltage, such as that supplied by the LTC1541 is also provided to an analog-to-digital converter input of microcontroller 501 thus allowing the microcontroller to more accurately determine the level of any voltage measured through its analog to digital converter and also to more accurately determine the level of its $V_{dd}$ power supply.

It is well understood by those with skill in the art that the rotational speed of a sprinkler is influenced by the pressure of the water supply powering the sprinkler. In an embodiment of the invention, the relationship between a sensed rotational speed which occurs when there is a known braking force may be exploited to estimate the water pressure. Note that when the battery charges, the battery charging circuit will draw current from the generator which will tend to slow down the speed of rotation. The water pressure is estimated by turning off the battery charging circuit first. Then, a known electrical load is applied to the generator (braking force) for measuring the speed of rotation. The sprinkler may be characterized such that the relationship between speed of rotation with this known braking force and water pressure can be known to the microcontroller. This relationship may be stored in a lookup table and thus the water pressure can be determined by measuring the speed of rotation given a specific predetermined braking force.

Figure 8:
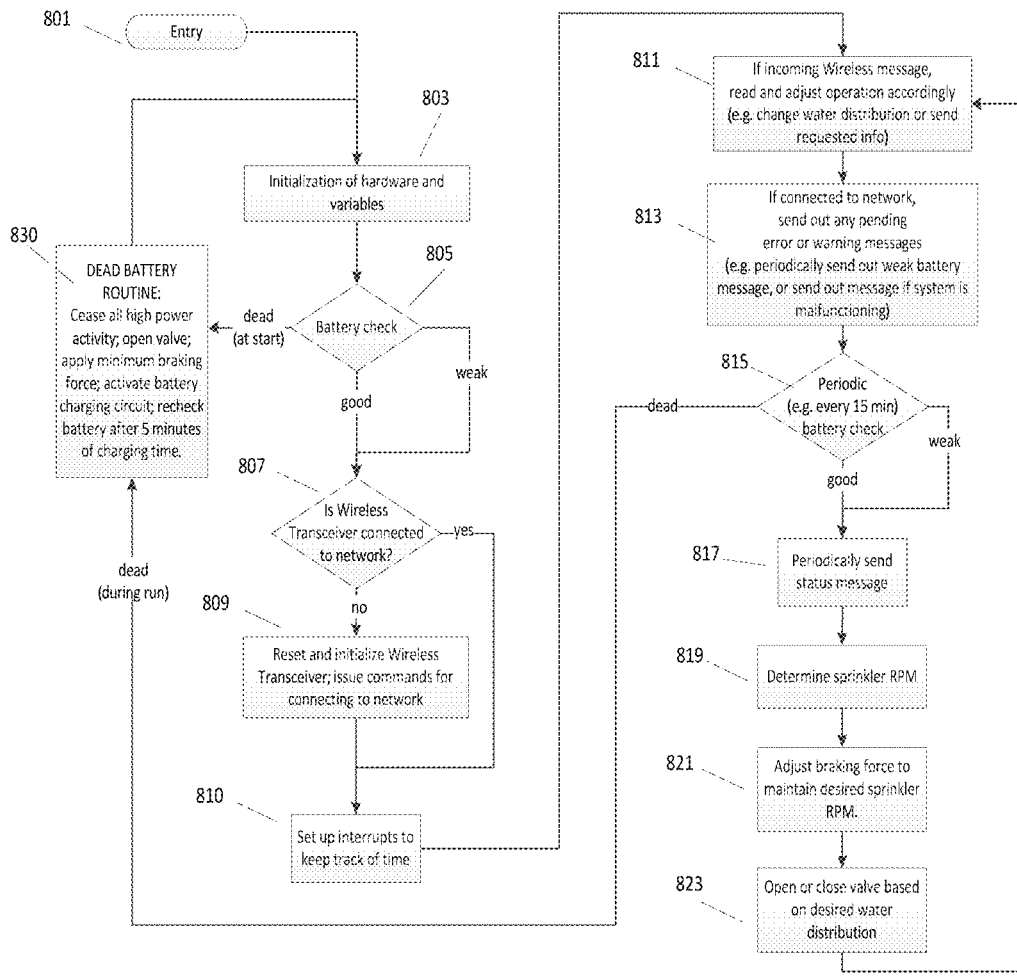
FIG. 8 is an exemplary software flowchart, showing start-up and normal operation of the motion control system employing an AC generator in accordance with one embodiment of the invention.

FIG. 8 is an exemplary flowchart of the firmware programmed in the microcontroller of an embodiment of the invention. This exemplary firmware will be described below with reference to a sprinkler application and is applicable to hardware similar to that shown in FIG. 5. Steps 801 through 810 are executed following start-up of the device. These may occur when power is first applied (that is, when the battery 521 or 421 is first attached) or when the system has been reset. Step 801 is the entry point, indicating the beginning of firmware execution at reset or when power is first applied. At 803, the hardware and program variables are initialized and following this step the health of the rechargeable battery is checked at 805. In an embodiment of the invention, the microcontroller positive supply is at $V_{dd}$, which is the positive terminal of battery 521 and the microcontroller ground is connected to the negative terminal of battery 521. There is no negative supply available to the microcontroller.

Algorithms for verifying battery voltage are well-known by those with skill in the art. In one embodiment, a voltage reference is measured with respect to $V_{dd}$ by the integral analog-to-digital converter present in the microcontroller. The number of ADC counts which represent the so-measured voltage reference is thus an indication of the absolute voltage of the $V_{dd}$ supply which powers the microcontroller and therefore is representative of the present voltage of the rechargeable battery. Comparison of this value with built-in program constants can thus determine whether the battery is good, weak or "dead." If the battery is good or weak, firmware execution moves on to step 807. If the battery voltage is too low to operate the motion control system properly, execution continues with what may be referred to as the "dead battery routine" step 830, explained further below.

At step 807, the firmware determines whether or not the wireless transceiver 503 is currently connected to the wireless network. When wireless transceiver 503 is "connected" it can communicate with the base station (see FIG. 9) and report information to the base station and receive information from the base station. It is preferable to maintain communication with the base station at all times because this enables the system to be controlled and adjusted according to the wishes of the operator of the base station and also allows the system to inform the base station as to its status and whether there are any reported errors or warning conditions which may be important to the manager of the system.

If the wireless transceiver is connected, then execution moves on to step 810; but if the wireless transceiver is not connected, then step 809 is performed, which initiates the connection process. The connection process may take several minutes depending on the characteristics of the wireless network and wireless transceivers used in the system.

Next, step 810 sets up the timing logic in microcontroller 501 such that each sprinkler in the system will have intelligent knowledge of time. In an embodiment, sprinklers need not know the "real time," that is they do not need to be aware of precise time of day. They do, however, need to know how much time has passed since step 810 was executed. In another embodiment, precise time of day and date are known by the sprinklers and timing of events may depend on that precise knowledge of real time. In a preferred embodiment, the base station can inform each sprinkler as to the precise real time and the individual sprinklers do not need to independently have knowledge of time of day.

Steps 811 through 823 are performed in a loop (the "run loop") and may be performed one to four times per second. In an embodiment of the invention, a sprinkler runs a "water distribution instruction" which is initiated either at a specific time (perhaps daily) or whenever the master valve which controls the flow of water is turned on. This instruction is a specific RPM or specific braking force and, optionally, a specific setting of a local valve, such as the percentage of time the local valve is on. A water distribution instruction may also include a duration of time during which it will be active. If the water distribution instruction includes a duration, for example 10 minutes, then after that time has elapsed, the instruction is no longer active and the sprinkler will either shut off or return to some default instruction. For example, the water distribution instruction may specify that the sprinkler will rotate at 20 RPM for 25 minutes with the local valve turning on for 20 seconds and turning off for 20 seconds, which means that water is flowing 50% of the time. Another instruction may be queued up to run after the present instruction times out, in this case after 25 minutes. There may be several instructions stored in the memory of a sprinkler and instructions may be read and written by the base station in order to adjust the behaviour of any individual sprinkler or any group of sprinklers over time.

The "run-time" loop of steps 811 through 823 performs the following functions:

a. Check for incoming wireless messages and act on them (811);

b. Send outgoing wireless messages regarding errors and/or warnings (such as weak battery or other malfunctions (813);

c. Periodically, for example every 15 minutes, check the battery and if the battery is too weak to properly operate the motion control system, exit the run loop and enter the dead battery routine, step 830 (815);

d. Periodically send status messages to the base station (these may occur once every, e.g. 15 minutes, or may be sent whenever a significant event has occurred such as an error or warning or speed change or status change, etc.) (817);

e. Determine the sprinkler RPM (819);

f. Based upon the current water distribution instruction, adjust the braking force to maintain the desired sprinkler rotational speed (821), and g. Open or close the valve based on the desired water distribution. (823).

The microcontroller has knowledge of elapsed time such that it can begin or end a particular water distribution instruction at the proper moment. Further, the microcontroller will open and close the local valve to modulate water flow according to the current water distribution instruction (step 823). For example, in an embodiment of the invention, the run loop (steps 811 through 823) execute twice per second. If, for example, the current water distribution instruction provides for 20 seconds of water flow followed by 20 seconds of no water flow (50% duty cycle), this opening and closing of the valve will take place at step 823 accordingly. There would, in that case, be 40 loops or 20 seconds with the valve open followed by 40 loops or 20 seconds with the valve closed and this would repeat throughout that particular water distribution instruction.

It is pertinent to note that although this flowchart specifically addresses the closed loop control of sprinkler rotational rate by means of electrical braking and valve control, water distribution may be adjusted by some other means and/or other parameters may be adjusted as well. For example, the system may adjust a pinch valve or some other type of valve in order to adjust the flow rate or pressure of the water supply in the system and thereby adjust the speed of rotation and the volumetric flow of water through the sprinkler.

However, there will be periods of time during which the loop (steps 811 through 823) will execute and no water will be flowing. This may be intentional as in situations where, for example, a center pivot is travelling over a pond and it is proper to stop the flow of water. Alternatively, there may be no water flow because the master valve is turned off. As illustrated in FIG. 8, in a preferred embodiment each sprinkler has its own on/off valve which can be programmatically controlled by the sprinkler itself. In other embodiments the master water flow on/off valve may be controlled manually or by another system entirely. In any event, the firmware which is executed during the run time loop must be able to operate properly under no flow conditions. If, however, the system expects water to be flowing and the sprinkler detects that no water is flowing (sprinkler not rotating), the sprinkler may inform the base station of that condition. Such a situation could indicate a break in a water pipe or some other sort of malfunction.

A dead battery situation results in execution of step 830. It is to be noted that certain activities of the motion control apparatus require higher power than other activities. For example, the process of connecting the wireless transceiver to the network is expensive in terms of time and power and it is desirable to never need to disconnect from the wireless network. Similarly, operating a valve or a display may be expensive in terms of power. In an embodiment of the invention, all higher power activities are discontinued during the execution of step 830. An example of a higher power activity is the operation of the wireless transceiver. Thus entering step 830 may disconnect the wireless transceiver from the network, which is undesirable. Further, during the period in which the battery is dead, the power required to operate the microcontroller may be reduced by running the microcontroller at a slower clock rate. In a preferred embodiment, the power required to execute the run time loop 811-823 is very low and this loop may continue running for months without failure given a properly charged battery. However, there is always the possibility that the battery drains because of malfunction or because of non-use of the system. In such cases the firmware must accommodate the situation and this is the main purpose of step 830.

The dead battery routine in a preferred embodiment turns off the wireless transceiver and slows down the clock speed of the microcontroller and turns off all unnecessary features in order to conserve power. Current draw from the battery may be reduced to less than 10 µA in such a situation. The rechargeable battery used in a preferred embodiment may have a capacity of greater than 500 mA-h. Assuming that the dead battery routine is called when the battery is discharged to only 10% of its capacity (50 mA-hr remaining), the dead battery handler routine may operate for 5000 hours or longer than 200 days (50 mA-hr/10 µA=5000 hrs.). Further, the dead battery routine opens the valve, releases any braking force and activates the battery charging circuit, thus ensuring that when the sprinkler spins, the maximum amount of power will be harvested to enable the battery to recharge as quickly as possible. The dead battery routine will periodically check the battery voltage and if there is adequate charge will exit and restart the firmware execution at step 803

Figure 9:
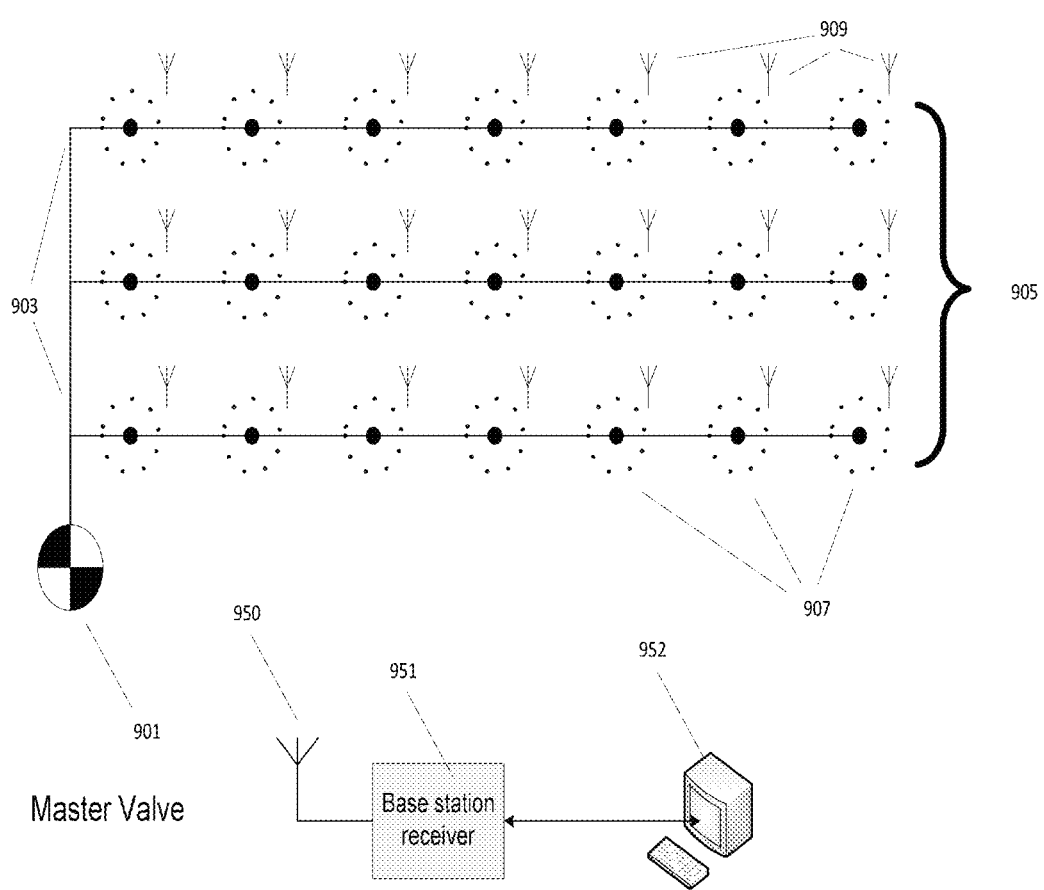
FIG. 9 is an illustration of an irrigation system showing sprinklers and base station according to one embodiment of the invention.

FIG. 9 shows a block diagram of an irrigation system installation in accordance with the invention. Master valve 901 is shown and when ON the master valve will supply water to a set of sprinklers 905 via pipes 903. Each sprinkler 907 has an antenna 909 as each sprinkler has its own wireless transceiver. In sufficient proximity to the set of sprinklers is the base station receiver 951 with its own antenna 950. In an embodiment of the invention, base station receiver 951 is located within 100 meters of every sprinkler in the field. The base station receiver is wired to a computer system 952, which is used by the manager of the system to:
 1) view status;
 2) be informed of errors and warnings; and
 3) control the system in general.

In a preferred embodiment, the base station receiver is solar powered thus eliminating the need to run electricity to it. In another embodiment the base station receiver in turn wirelessly communicates with the manager's computer system 952.

Although this invention has been described in terms of certain preferred embodiments, other embodiments that are apparent to those of ordinary skill in the art, including embodiments that do not provide all of the features and advantages set forth herein, are also within the scope of this application. Rather, the scope of the present invention is defined only by reference to the appended claims and equivalents thereof.

We claim:

1. A motion control apparatus comprising:
    a sprinkler;
    an external energy source coupled to the sprinkler, said external energy source providing kinetic energy to the sprinkler;
    an energy conversion module mechanically coupled to the sprinkler, wherein the energy conversion module is configured to convert kinetic energy generated by the rotational motion of the sprinkler into electrical energy and the energy conversion module is configured to also provide a braking force to control the motion of the sprinkler, wherein the braking force is an electrical load;
    an electronic circuit coupled to the energy conversion module, wherein said electronic circuit comprises a microcontroller, wherein the energy conversion module and the microcontroller are located within the motion control apparatus;
    an electrical energy storage module coupled to the electronic circuit;
    at least one sensor module coupled to both the electronic circuit and the sprinkler to sense the movement of the sprinkler to determine a speed of the sprinkler and transmit the speed information to the electronic circuit; and
    a wireless communication module coupled to said microcontroller, wherein the wireless communication module is configured to receive commands wirelessly to control motion of the sprinkler,
        wherein said energy conversion module is an electric generator powering the electronic circuit, and a rotational speed of the electric generator is regulated by the microcontroller by applying a pulse-width-modulated signal to a N-channel field-effect transistor coupled to the electric generator and a signal conditioning circuit coupled to the microcontroller and the electric generator to condition output electrical energy from the electric generator.

2. A motion control apparatus as claimed in claim 1, wherein said external energy source is pressurized flowing water.

3. A motion control apparatus as claimed in claim 1, wherein the wireless communication module is configured to transmit information wirelessly, the transmitted information comprising information about the status of the sprinkler, and charge status of the electrical energy storage module.

4. A motion control apparatus as claimed in claim 1, wherein said electrical load is adjusted by said electronic circuit.

5. A motion control apparatus as claimed in claim 1, further comprising indicators and a display.

6. A motion control apparatus as claimed in claim 1, wherein said sensor module is configured to sense rotational speed of the sprinkler by determining the frequency of an alternating current signal at the output of the sensor module.

7. A motion control apparatus as claimed in claim 2 which further comprises a valve coupled to the electronic circuit for turning on and turning off the flow of the pressurized flowing water.

8. A motion control apparatus as claimed in claim 7, wherein the electronic circuit is configured to operate the valve on a multitude of duty cycles.

9. A motion control apparatus as claimed in claim 8, wherein the valve is a low power electrically actuated valve.

10. A motion control apparatus as claimed in claim 1 wherein said electric generator comprises one of a center-tapped alternating current generator and a direct current generator.

11. A motion control apparatus as claimed in claim 2, wherein water pressure is calculated by placing a known electrical load on said energy conversion module and comparing the sensed rotational speed of the sprinkler to a reference speed.

12. A method of motion control comprising:
    applying energy to a sprinkler from an energy source external to the sprinkler, the external energy source being pressurized flowing water;
    converting kinetic energy of the sprinkler to electrical energy by an energy conversion module mechanically coupled to the sprinkler, and controlling the motion of the sprinkler with the energy conversion module by applying a braking force from the energy conversion module, the energy conversion module coupled to and controlled by an electronic circuit comprising a microcontroller, the electronic circuit coupled to the energy conversion module and the energy storage module, wherein said energy conversion module is an electric generator powering the electronic circuit;
    storing electrical energy derived from kinetic energy of the sprinkler in an energy storage module;
    regulating a rotational speed of the electric generator by the microcontroller, by applying a pulse-width-modulated signal to a N-channel field-effect transistor coupled to the electric generator;
    conditioning an output electrical energy from the electric generator by a signal conditioning circuit coupled to the microcontroller and the electric generator;
    sensing the movement of the sprinkler by at least one sensor module, the sensor module coupled to the electronic circuit; and
    calculating water pressure by placing a known electrical load on said energy conversion module and comparing the sensed movement of the sprinkler to a reference speed.

13. A method of motion control as claimed in claim 12, wherein the sprinkler is a movable rotating mechanism and wherein the sensing is sensing of the rotational speed of the sprinkler.

14. A method of motion control as claimed in claim 13, wherein the braking force comprises an electrical load.

15. A method of motion control as claimed in claim 14, wherein sensing the rotational speed of the sprinkler comprises sensing the rotational speed by processing a signal from the sensor module.

16. A method of motion control as claimed in claim 13, wherein the electronic circuit controls the rotational speed of the sprinkler with a closed loop method, the closed loop method comprising:

sensing the rotational speed of the sprinkler by the sensor module; and controlling the rotational speed of the sprinkler based upon said sensing to achieve a predetermined rotational speed.

17. A method of motion control as claimed in claim 12, wherein the electronic circuit comprises a microcontroller, the microcontroller being coupled to a wireless communication module, the wireless communication module being configured to receive commands wirelessly to control motion of the sprinkler.

18. A method of motion control as claimed in claim 17, wherein the wireless communication module is configured to transmit information wirelessly, the transmitted information comprising information about the status of the sprinkler and charge status of the electrical energy storage module.

19. A method of motion control as claimed in claim 12, wherein said sensor module is configured to sense rotational speed of the sprinkler by determining the frequency of an alternating current signal at the output of the sensor module.

20. A method of motion control as claimed in claim 12, further comprising controlling a valve by the electronic circuit for turning on and off the flow of the external energy source.

21. A method of motion control as claimed in claim 20, wherein the electronic circuit is configured to operate the valve on a multitude of duty cycles.

* * * * *